(12) United States Patent
Czajor

(10) Patent No.: US 8,220,758 B2
(45) Date of Patent: Jul. 17, 2012

(54) CABLE HANGER

(76) Inventor: Rene Gilles Czajor, Hamilton (CA)

( * ) Notice: Subject to any disclaimer, the term of this patent is extended or adjusted under 35 U.S.C. 154(b) by 0 days.

(21) Appl. No.: 13/030,918

(22) Filed: Feb. 18, 2011

(65) Prior Publication Data

US 2011/0204191 A1 Aug. 25, 2011

Related U.S. Application Data

(62) Division of application No. 11/512,283, filed on Aug. 30, 2006, now Pat. No. 7,891,614.

(30) Foreign Application Priority Data

Jan. 6, 2006 (CA) .................................... 2532492

(51) Int. Cl.
*F16L 3/22* (2006.01)
(52) U.S. Cl. ........... 248/68.1; 248/75; 248/76; 242/405; 242/405.1
(58) Field of Classification Search ............ 248/90, 248/92, 75, 58, 62, 63, 67.1, 74.1, 74.4, 302, 248/303, 307, 153; 242/405, 405.1, 404.3, 242/400.1, 129, 222, 388
See application file for complete search history.

(56) References Cited

U.S. PATENT DOCUMENTS

| | | | | |
|---|---|---|---|---|
| 314,785 A * | 3/1885 | Bissell | ............................ | 256/35 |
| 426,655 A * | 4/1890 | Bennett | ............................ | 248/552 |
| 588,886 A * | 8/1897 | Smith | ............................ | 24/706.1 |
| 679,900 A * | 8/1901 | Burt | ............................ | 248/489 |
| 754,483 A * | 3/1904 | Mustgrove | ............................ | 248/552 |
| 816,473 A * | 3/1906 | Johnson | ............................ | 294/158 |
| 1,054,171 A * | 2/1913 | Buermann | ............................ | 224/42.18 |
| 1,377,413 A * | 5/1921 | Dwelle | ............................ | 70/200 |
| 1,713,230 A * | 5/1929 | Hunt | ............................ | 70/61 |
| 2,119,217 A * | 5/1938 | Rocchi | ............................ | 206/376 |
| 2,243,387 A * | 5/1941 | Livingston | ............................ | 294/165 |
| 2,268,996 A * | 1/1942 | Young | ............................ | 242/404.3 |
| 2,848,114 A * | 8/1958 | Kruger | ............................ | 211/49.1 |
| 3,378,180 A * | 4/1968 | Singer | ............................ | 223/87 |
| 3,592,343 A * | 7/1971 | Swett et al. | ............................ | 211/123 |
| 4,123,012 A * | 10/1978 | Hough | ............................ | 242/405.2 |
| 4,248,399 A * | 2/1981 | Gipson | ............................ | 248/552 |
| 4,277,035 A * | 7/1981 | Gaski | ............................ | 242/404.3 |
| 4,524,872 A * | 6/1985 | Chamberlain | ............................ | 211/4 |
| 4,550,892 A * | 11/1985 | Whitley | ............................ | 248/90 |
| 4,658,100 A * | 4/1987 | Suris | ............................ | 191/41 |

(Continued)

*Primary Examiner* — Kimberly Wood
(74) *Attorney, Agent, or Firm* — Steven M. Greenberg; Carey Rodriguez Greenberg & O'Keefe, LLP

(57) ABSTRACT

A cable hanger having a mounting end for attachment to a support structure and a cable support portion coupled to the mounting end. The cable support portion has at least two spaced parallel legs defining a receiving slot therebetween. Each receiving slot has a closed bottom and an open top end for receiving and locating loops of a cable formed into a coil. Preferably, the mounting end is adapted to be releasably attached to the support structure and the cable hanger is formed from bent rod. The mounting end will preferably have a hook shape with a free end attaching to the support structure which is spaced from the cable support portion to optionally receive a portion of a support structure therebetween. The receiving slots will have a height and width selected to accommodate the diameter and length of cable being supported and the number of receiving slots may vary accordingly. For some applications, the cable hanger includes tie bars whereby the associated cable may be secured in the receiving slots with a padlock and the cable support itself may be secured to a support structure.

1 Claim, 11 Drawing Sheets

U.S. PATENT DOCUMENTS

| | | | | |
|---|---|---|---|---|
| 4,688,739 A | * | 8/1987 | Moore | 242/405.2 |
| 4,756,504 A | * | 7/1988 | Chamberlain | 248/552 |
| 4,997,997 A | * | 3/1991 | Moore | 191/12.2 R |
| 5,064,067 A | * | 11/1991 | McAllister et al. | 206/420 |
| D336,603 S | * | 6/1993 | Penaflor | D8/336 |
| 5,961,081 A | * | 10/1999 | Rinderer | 248/68.1 |
| 6,003,803 A | * | 12/1999 | Knapp et al. | 242/388 |
| 6,135,381 A | * | 10/2000 | Teson | 242/404.3 |
| 6,458,104 B2 | * | 10/2002 | Gautsche | 604/179 |
| 7,350,737 B2 | * | 4/2008 | Hutchinson | 242/405 |

\* cited by examiner

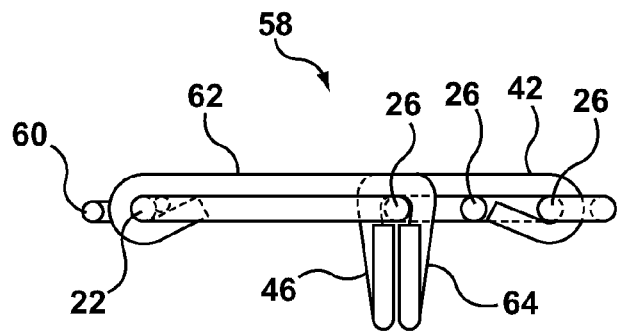
FIG. 4
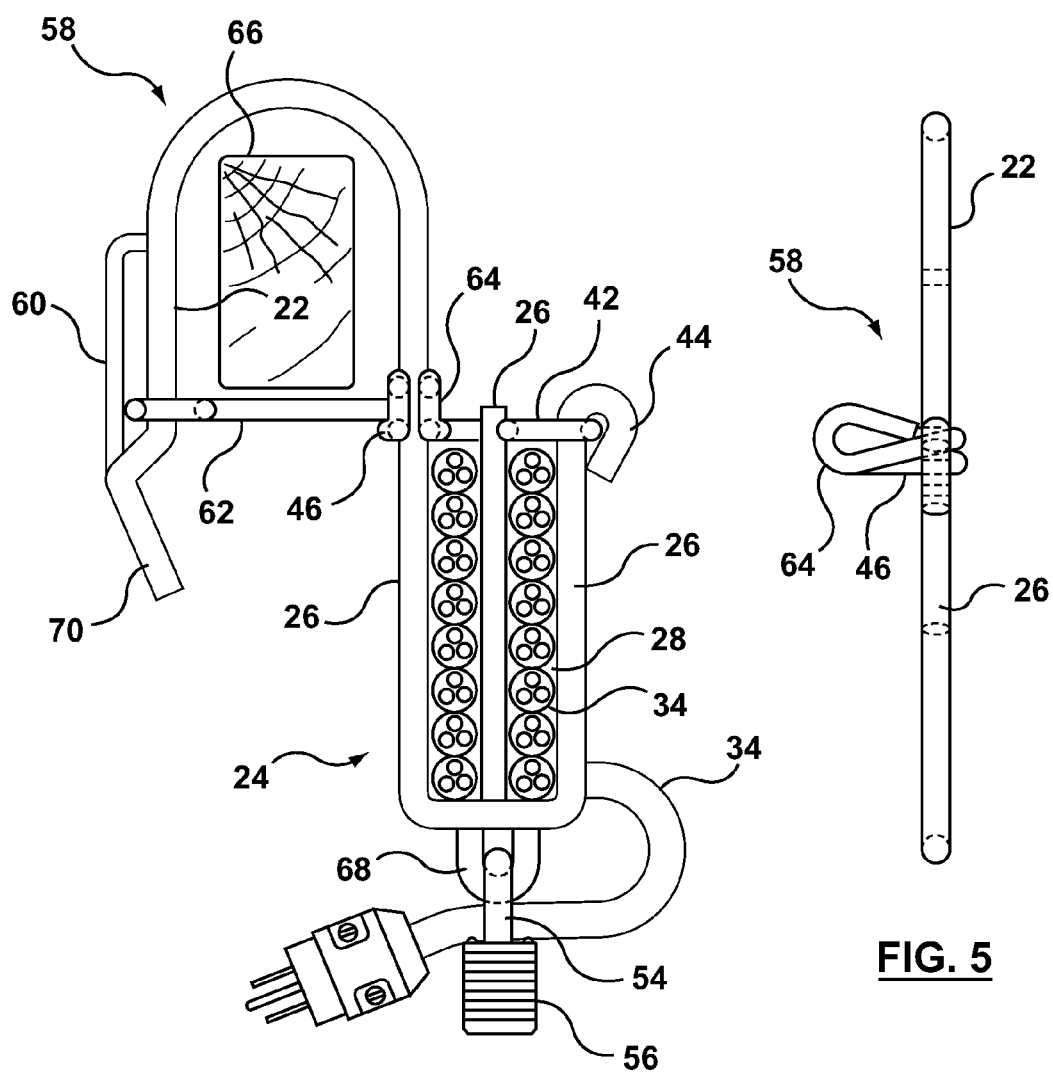
FIG. 3
FIG. 5

CABLE HANGER

CROSS-REFERENCE TO RELATED APPLICATIONS

This application is a Divisional of U.S. application Ser. No. 11/512,283, filed Aug. 30, 2006, entitled "CABLE HANGER" the entirety of which is incorporated herein by reference.

FIELD OF INVENTION

This invention relates to a hanger for suspending cable, including welding cable, electrical cord, hose, wire or rope so that it may conveniently be stored in a tidy fashion away from the floor and secured, as necessary.

BACKGROUND OF THE INVENTION

Convenient storage of electrical cable such as welding cable and extension cords is a problem which is understood by many homeowners who have wrestled with an extension cord, perhaps after mowing the lawn or using a snow blower or power tool. The problem is exacerbated in industrial construction and maintenance where the cables used for welding and powering electrical heavy equipment may be of very thick diameter and extremely long. Such cables may weigh in excess of forty pounds, and be fifty to one hundred feet long.

Improper storage of cable results in inevitable entanglements of the cable with consequent losses in productivity as maintenance workers retrieve and untangle cable. Cable which lies on the floor can be a tripping hazard, is susceptible to damage from being run over by fork trucks and the like, becomes covered in grease and debris and is subject to damage, such as cutting and melting of the plastics sleeve from welding sparks and molten steel caused by grinding and torch cutting operations. Adequate cable support is therefore required during use of the cable as well as during storage to protect the cable from damage but also to keep the workplace clear and safe.

To save space, cables are usually coiled and individual loops are secured at one end of a coil with a fastener such as tape, string, tie strips and the like. The coil can conveniently be suspended from a wall-mounted hook.

In U.S. Pat. No. 6,572,058, a cable support bracket is provided for mounting to a wall or other supporting structure. The bracket has an outwardly extending horizontal plate and a central tab combining to form a U-shaped channel for receiving and locating individual loops of a cable. The arrangement is intended to prevent the cable from becoming tangled. However, access to the U-shaped channel is limited by a small gap formed in the outwardly extending plate and commensurate with the cable diameter. The device is of limited capacity and requires a permanent or semi-permanent installation and therefore is not portable.

U.S. Pat. No. 4,742,979 provides a cable hanger for suspension from ceiling wires and is adapted to be used in the space defined between a roof and a suspended ceiling. A U-shaped trough is used to support a coil of wires and the like and is formed from bent rod which conveniently is shaped to slide on and grip a ceiling suspension wire. The device is unsuitable for use with the heavy power cables and welding cables for which this invention is intended.

An object of this invention is to provide a convenient and reliable support for cable which overcomes, at least in part, some of the aforementioned problems.

SUMMARY OF THE INVENTION

In accordance with this invention, there is provided a cable hanger having a mounting end for attachment to a support structure and a cable support portion coupled to the mounting end. The cable support portion has at least two spaced parallel legs defining side-by-side receiving slots therebetween. Each receiving slot has a closed bottom and an open top end for receiving and locating loops of a cable formed into a coil.

Preferably, the mounting end is adapted to be releasably attached to the support structure and the cable hanger is formed from bent rod.

The mounting end will preferably have a hook shape with a free end attaching to the support structure which is spaced from the cable support portion to optionally receive a portion of a support structure therebetween.

The receiving slots will have a height and width selected to accommodate the diameter and length of cable being supported and the number of receiving slots may vary accordingly.

For some applications, it is preferable for the cable hanger to include tie bars whereby the associated cable may be secured in the receiving slots with a padlock and the cable support itself may be secured to a support structure preventing unauthorized removal of the cable from the cable support portion and removal of the mounting end from the support structure. The cord of a power tool may also be inserted into the cable support portion with an extension cord to prevent unauthorized removal of the extension cord and the power tool.

BRIEF DESCRIPTION OF THE DRAWINGS

In order to better understand the invention, several embodiments are described below, with reference to the accompanying drawings, in which:

FIG. 3 is a front elevation view of a second embodiment of a cable hanger made in accordance with the invention;

FIG. 4 (drawn adjacent FIG. 3) is a plan view of the cable hanger of FIG. 3;

FIG. 5 (drawn adjacent FIG. 3) is a side elevation view of the cable hanger of FIG. 3;

DETAILED DESCRIPTION

Figure 1:
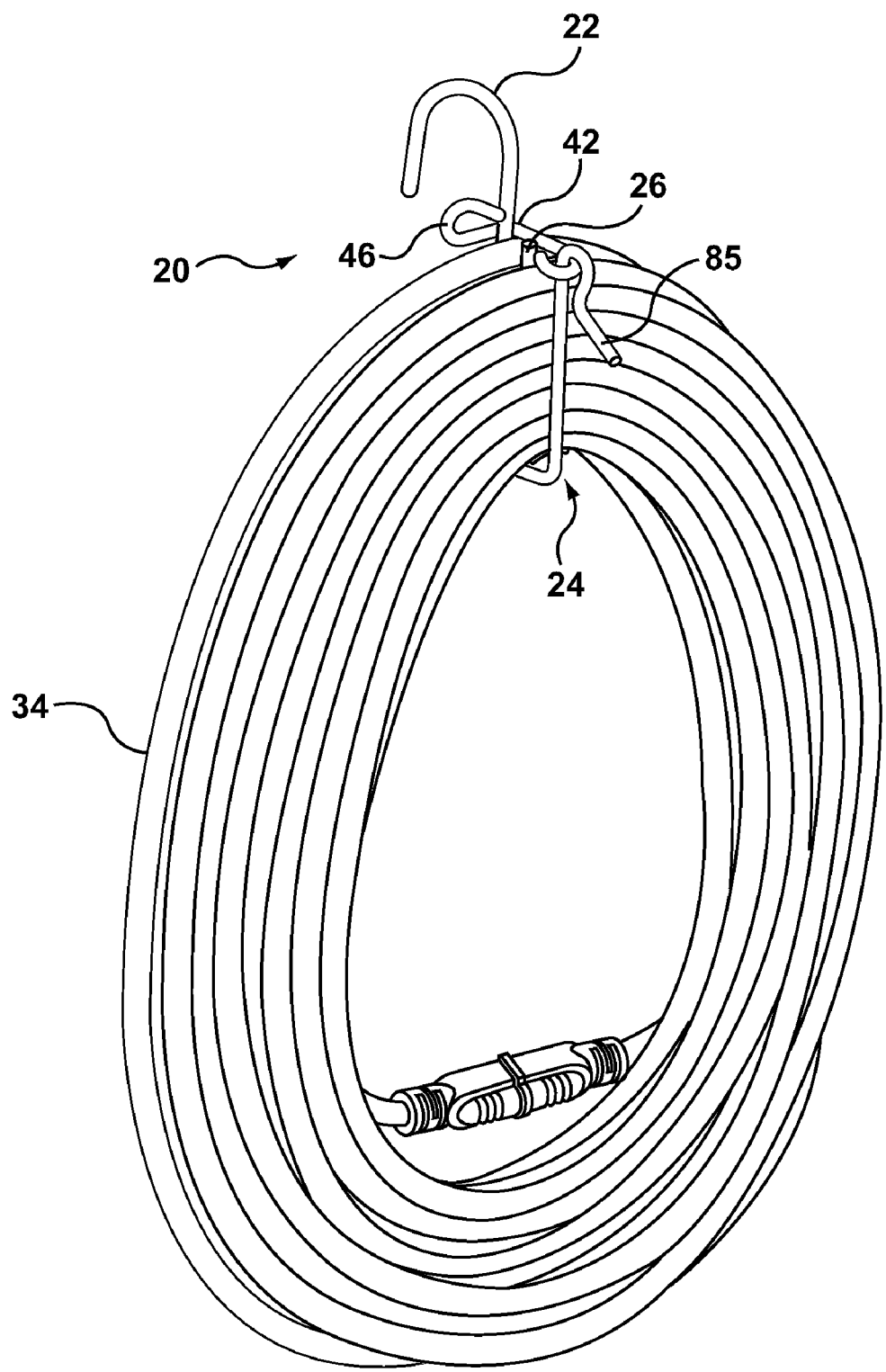
FIG. 1 is a perspective view of a cable hanger made in accordance with the invention shown in use in association with a coil of electrical cable.
Figure 2:
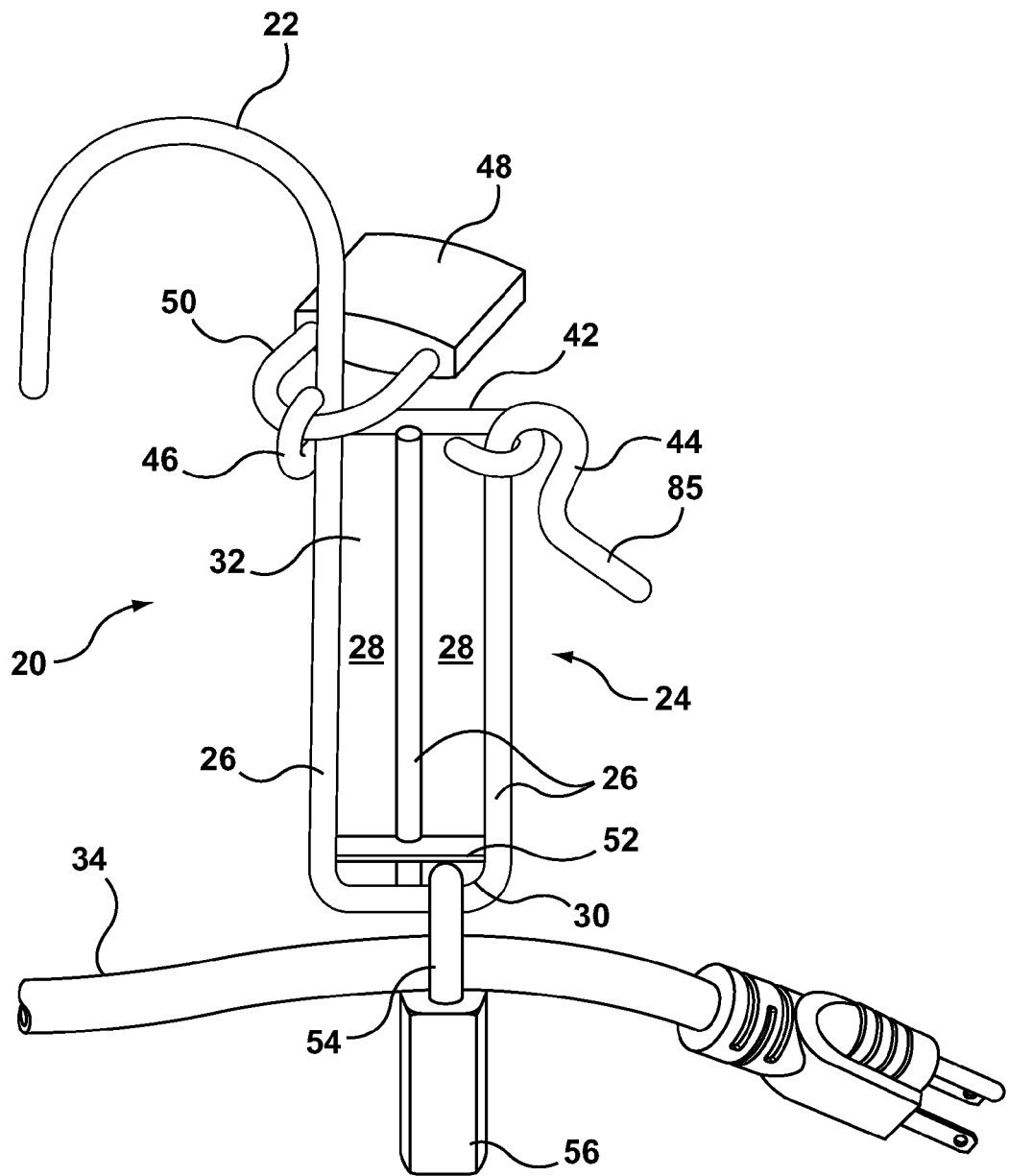
FIG. 2 is a front elevation view of the cable hanger of FIG. 1 (drawn to a larger scale) with the electrical cable unraveled.

A first embodiment of a cable hanger made in accordance with the invention is generally indicated by reference numeral 20 in FIGS. 1 and 2. The cable hanger 20 has a mounting end 22 for attachment to a support structure (not shown) and which in this embodiment consists of a simple hook with a free end. A cable support portion 24 is coupled to the mounting end 22 and has three spaced parallel legs 26 defining two side-by-side receiving slots 28 therebetween. Each receiving slot has a closed bottom end 30 and an open top end 32. Conveniently, the hooked mounting end 22 and outer legs 26 of the cable support portion 24 are formed from one length of bent rod having a general S-shaped configuration. The middle leg 26 is formed from a piece of rod welded between the inner and outer legs 26. While other materials may be used, rod is inexpensive, easy to form, and also resistant to physical abuse.

Figure 15:
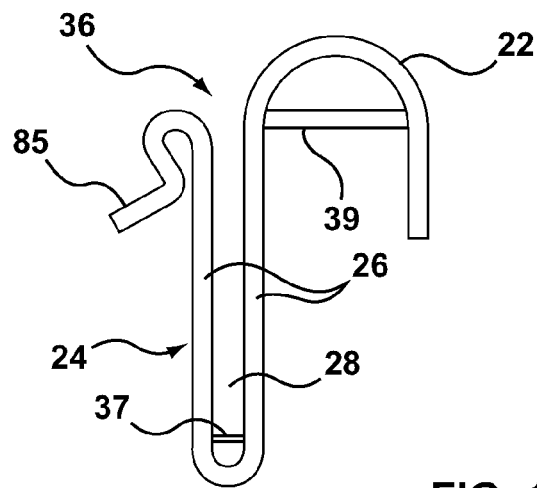
FIG. 15 is a side elevation view of embodiment six of a cable hanger made in accordance with the invention.
Figure 16:
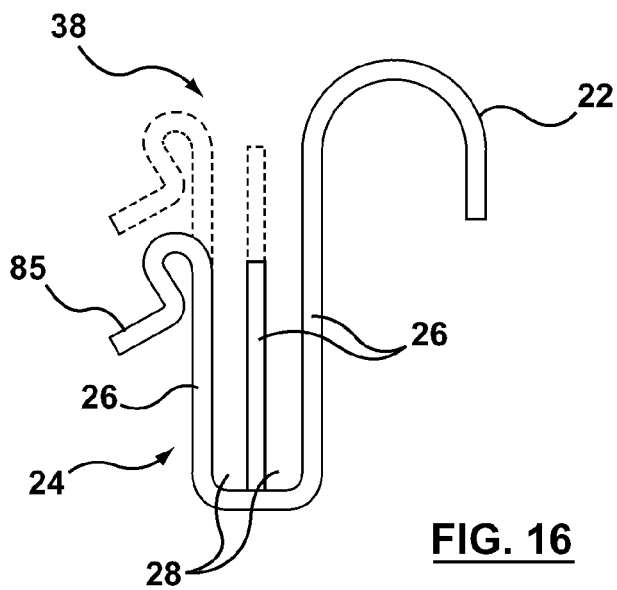
FIG. 16 is a side elevation view of embodiment seven of a cable hanger made in accordance with the invention.
Figure 17:
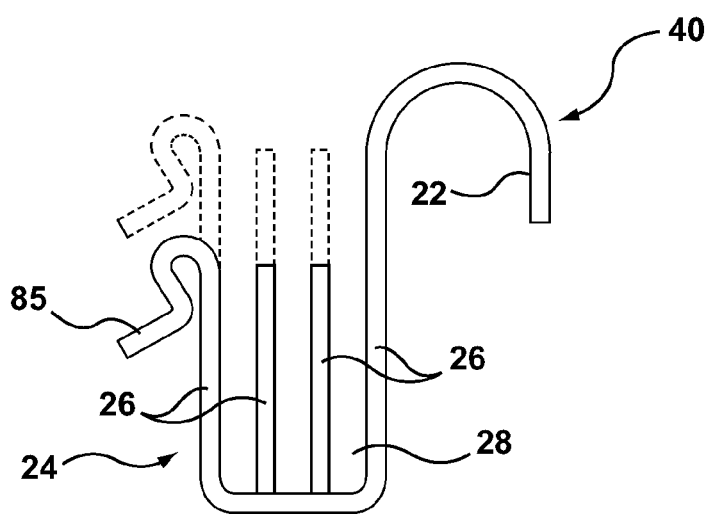
FIG. 17 is a side elevation view of embodiment eight of a cable hanger made in accordance with the invention.

An electrical extension cord 34 is shown in FIG. 1 with discrete loops of the cable disposed one above the other in the receiving slots 28 so as to form a coil. Each receiving slot 28 has a width which is commensurate with the diameter of cable to be supported therein and a height sufficient to receive a plurality of loops of the cable disposed one above the other in the receiving slots. It will be appreciated that the storage capacity of the cable hanger can be varied by changing the length of the slots 28 and the number of receiving slots 28 as schematically illustrated by the embodiments shown in FIGS. 15 to 17 where like numerals have been used to identify like parts. Thus, the embodiment 36 of FIG. 15 shows a single slot 28 reinforced with a plate 37 extending between parallel legs 26 and plate 39 extending across the bite of mounting end 22 to prevent splaying under load whereas the embodiment 38 of FIG. 16 shows two slots which may have more or less height as indicated in chain-dotted outline and the embodiment 40 of FIG. 17 has three receiving slots defined by four spaced parallel legs 26 in the cable support portion 24.

Returning to FIGS. 1 and 2, it will be seen that the cable hanger 20 has a releasable tie bar 42 which is disposed to lie across the open top end 32 of the receiving slots 28 to trap the electrical cable 34 between the tie bar 42 and the closed bottom end 30 of the receiving slots 28. The tie bar 42 consists of a short length of rod which is hooked at one end around an outer leg 26 of the cable support portion, the leg 26 having a free end which is itself bent to form an eyelet 44 to trap the tie bar 42. In this way, the tie bar 42 is hinged to outer leg 26. Meanwhile, the free end of the tie bar 42 is itself bent at a transverse angle and formed into an eyelet 46 to snap around the outer leg 26 of the cable support portion 24, as shown. By increasing the transverse angle, the holding power of the latch can also be increased. Once the tie bar 42 has snapped shut, splaying of legs 26 is prevented in the cable support portion.

A padlock 48 with hasp 50 threaded through the eyelet 46 to encircle the associated leg 26 may be used to secure the cable 34 in the cable support portion 24 and thereby prevent unauthorized removal of the cable.

A plate 52 which extends between the legs 26 of the receiving slots 28 is fixed to the cable support portion 24 with two welds on legs 26 preventing splaying of legs 26 when the tie bar 42 is unlatched. The plate 52 is conveniently spaced from the closed bottom end 30 of the receiving slots 28 to define two closed loops for receiving a second padlock hasp 54. The closed loop formed at the bottom of the cable support portion can be used to attach a rope, to tie cable or to secure the cable with a second padlock 56 as shown in FIG. 2 and thereby prevent separation of the cable from the cable hanger. A power tool may also be secured to the cable hanger using padlock 56.

Because the weight of the cable is not negligible and the load on the open hooked mounting end 22 considerable, it may be desirable to reinforce the hooked mounting end. A second embodiment of a cable hanger 58 is shown in FIGS. 3 to 5 in which such reinforcement is provided. Here the hooked mounting end 22 is reinforced by a parallel extending guide 60 closed at both ends to trap a second tie bar 62 that extends across the open bite portion of the hooked mounting end 22 and which can freely glide from one end of the guide 60 to the other. The second tie bar 62 is thus hinged to the mounting end 22 and has a free end which is bent transversely to the tie bar and formed into an eyelet 64 which clasps around one of the outer legs 26 of the cable support portion 24. In this way, the eyelets 46, 64 lie side by side and are adapted to receive a padlock hasp (not shown). Securing the cable hanger 58 in this way allows the second tie bar 62 to trap a portion of a support structure such as a two by four beam 66 thereby securing the entire assembly 58.

In yet another variation, the cable hanger 58 has a single closed loop 68 formed adjacent the closed bottom end 30 of the receiving slot 28 and which is suitable for suspending a utility lamp or securing a padlock 56 as shown.

Returning to the hooked mounting end 22, it will be observed that in the cable hanger 58 the free end of the hook 22 extends outwardly before progressing downwardly in the shape of a "dog's leg". This configuration of the free end 70 permits the cable hanger to be releasably attached to various support structures as schematically illustrated by FIGS. 6 to 9.

Figure 6:
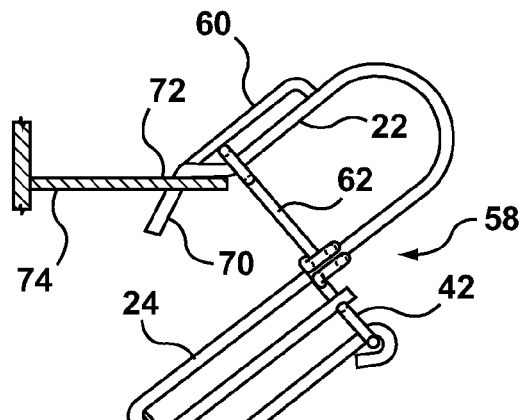
FIG. 6 is a front elevation view of the cable hanger of FIG. 3 shown with a hooked mounting end inserted into a hole.

In FIG. 6, the cable hanger 58 has free end 70 of the hooked mounting end 22 received in an aperture 72 formed in a bracket or shelf 74. It will be understood that a number of such cable hangers 58 may be supported at a height above the ground and spaced from each other at regular intervals in order to support cable suspended therebetween. In FIG. 6, it will be seen that the configuration of the free end 70 provides a mating surface for the hooked mounting end 22 to rest on the bracket 74 and be supported thereby.

Figure 7:
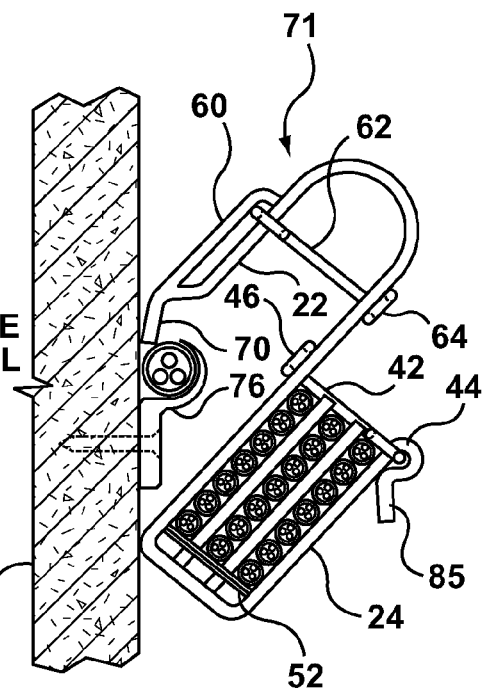
FIG. 7 is a similar view to FIG. 6 of a third embodiment of a cable hanger shown with a hooked mounting end hooked over a cable conduit.

In FIG. 7, a cable hanger 71 with four parallel legs 26 is shown with its free end 70 wedged between a cable conduit 76 supported by a bracket along a concrete wall 78.

Figure 8:
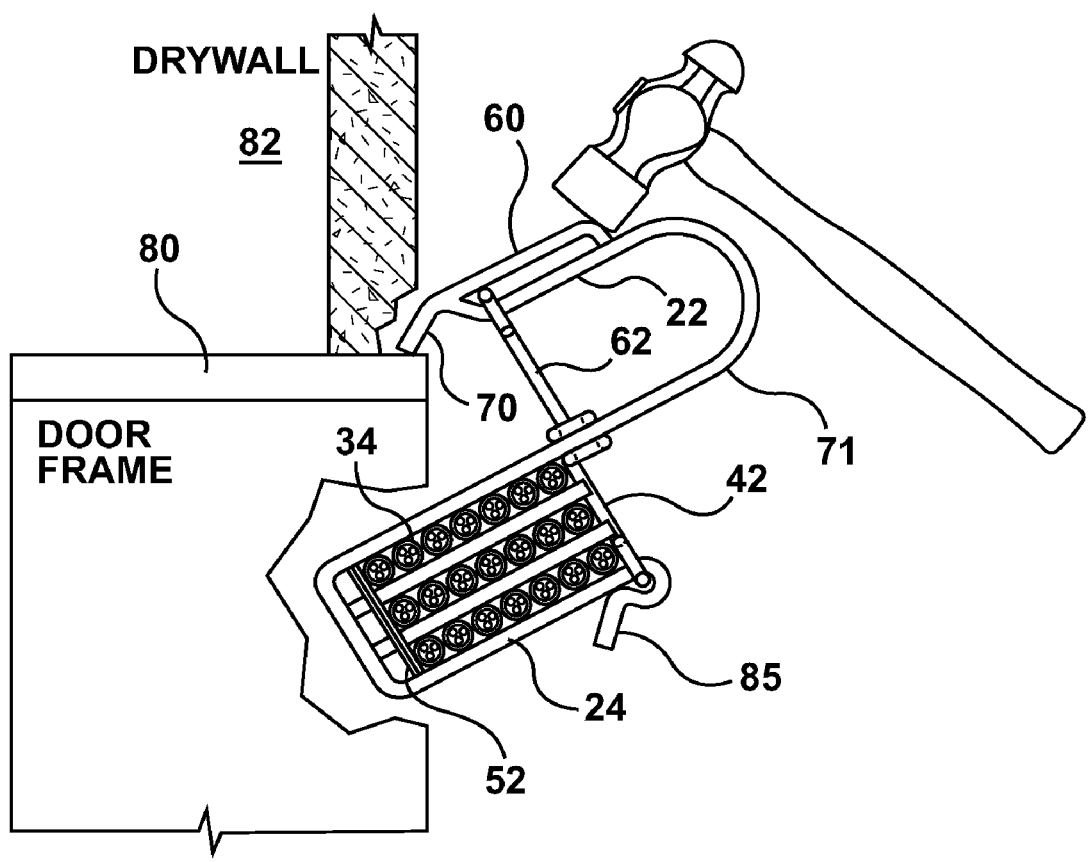
FIG. 8 is a similar view to FIG. 6 of the third embodiment of a cable hanger shown with a hooked mounting end located in a doorjamb.

In FIG. 8, the cable hanger 71 with four parallel legs 26 is shown in association with a door jamb 80 with its free end 70 having been hammered into the dry wall 82 so as to chip off a small corner above the door jamb.

Figure 9:
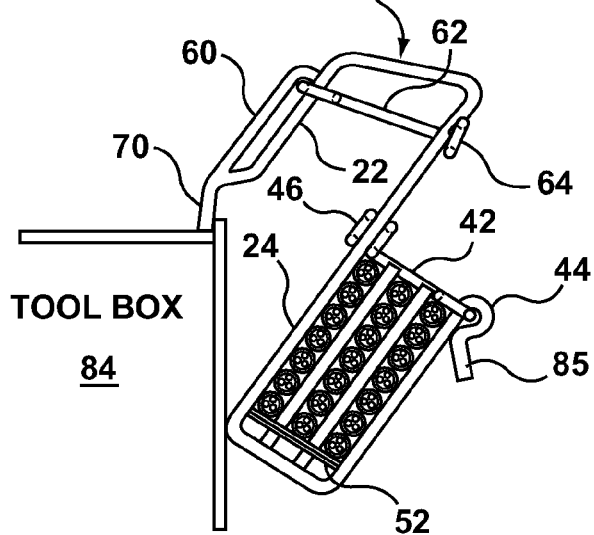
FIG. 9 (drawn adjacent FIG. 7) is a similar view to FIG. 6 of a fourth embodiment of a cable hanger shown with a hooked mounting end held by a lip on toolbox.
Figure 10:
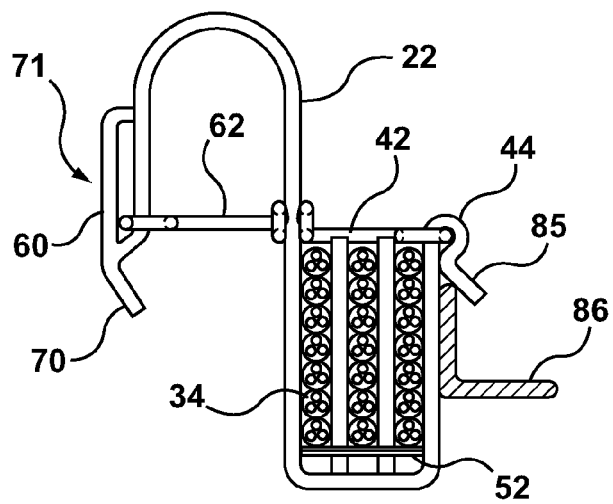
FIGS. 10 to 12 show the third embodiment of a cable hanger mounted to different structures by a mounting hook.
Figure 11:
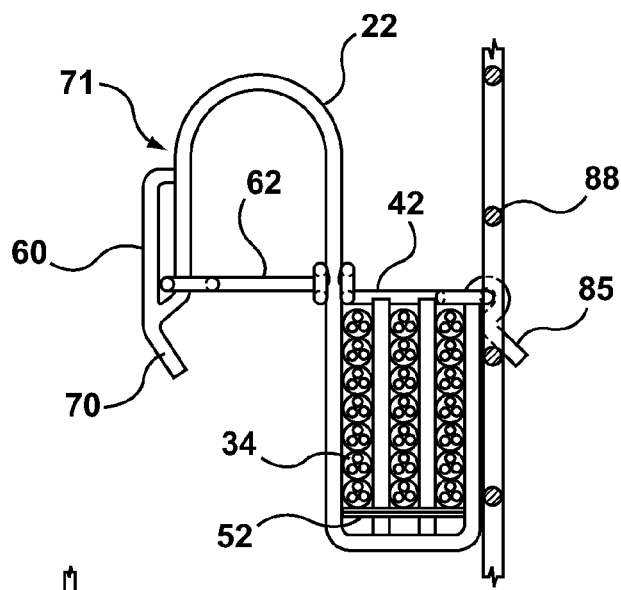
Figure 12:
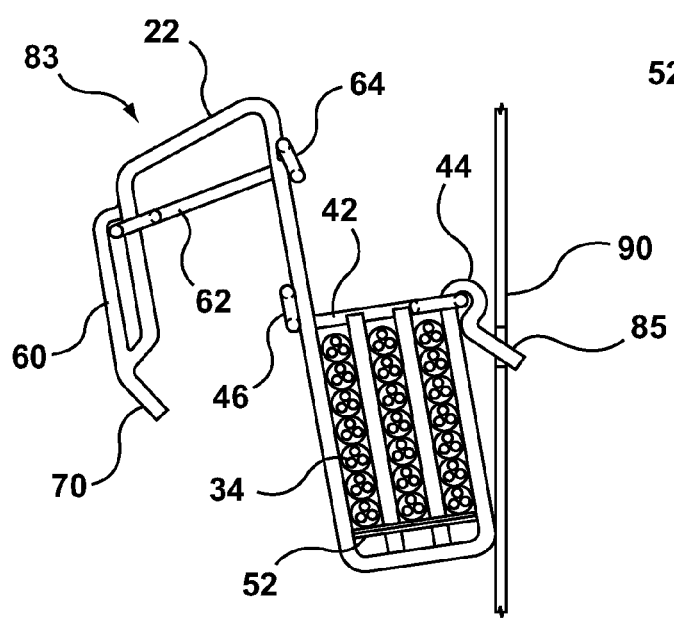

In FIG. 9, a cable hanger 83 is shown with the free end 70 of the hooked mounting end 22 supported by a lip portion of a toolbox 84. Here, the hooked mounting end 22 has no curvature in the open bite so that it is easier to grasp in the hand. Other forms of support structures which may be associated with the cable hanger according to the invention will be apparent to those skilled in the art. In some circumstances, it will be more practical to support the cable hanger from a mounting hook formed adjacent the outer leg 26 remote from the hooked mounting end 22. Such a mounting hook 85 is illustrated in the drawings of FIGS. 10 to 12 in association with various structures. In FIG. 10, the mounting hook 85 is shown hanging on a small lip such as an angle iron 86, whereas in FIG. 11 the mounting hook 85 is supported by square mesh fencing 88 which is used in the construction of tool cribs and in FIG. 12, the mounting hook 85 is inserted through a drilled hole or slot in steel plate 90.

Figure 13:
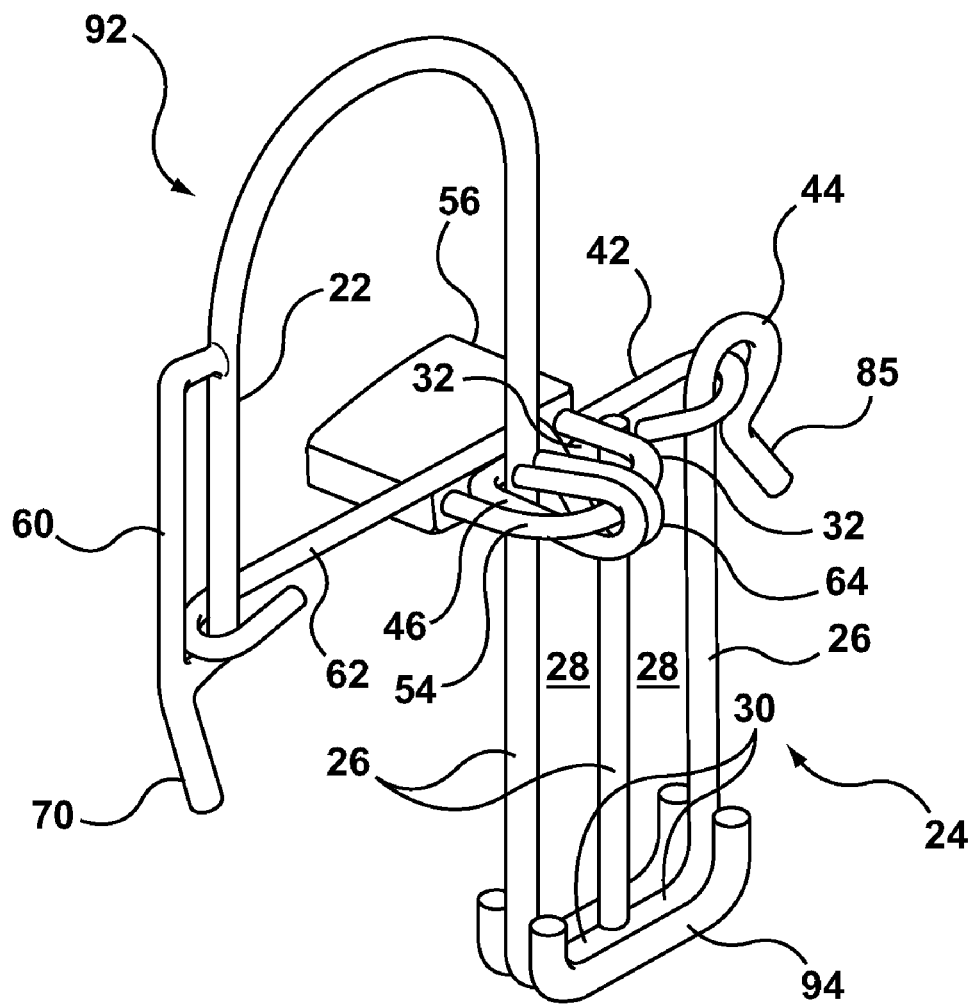
FIG. 13 is a perspective view of a fifth embodiment of a cable hanger made in accordance with the invention.

Another embodiment of the cable hanger is indicated by reference numeral 92 in FIG. 13. The cable hanger 92 is identical in most respects to the cable hanger 58 and like parts have again been identified by like numerals. Here it will be seen that the closed bottom end 30 of the receiving slots 28 has been made broader by welding additional pieces of rod to form a base 94. Such reinforcement allows the cable hanger to support more weight of cable, as necessary, while preventing the cable from becoming kinked and also reinforces the cable support portion 24 so that the outer legs 26 do not splay apart from each other.

Figure 14:
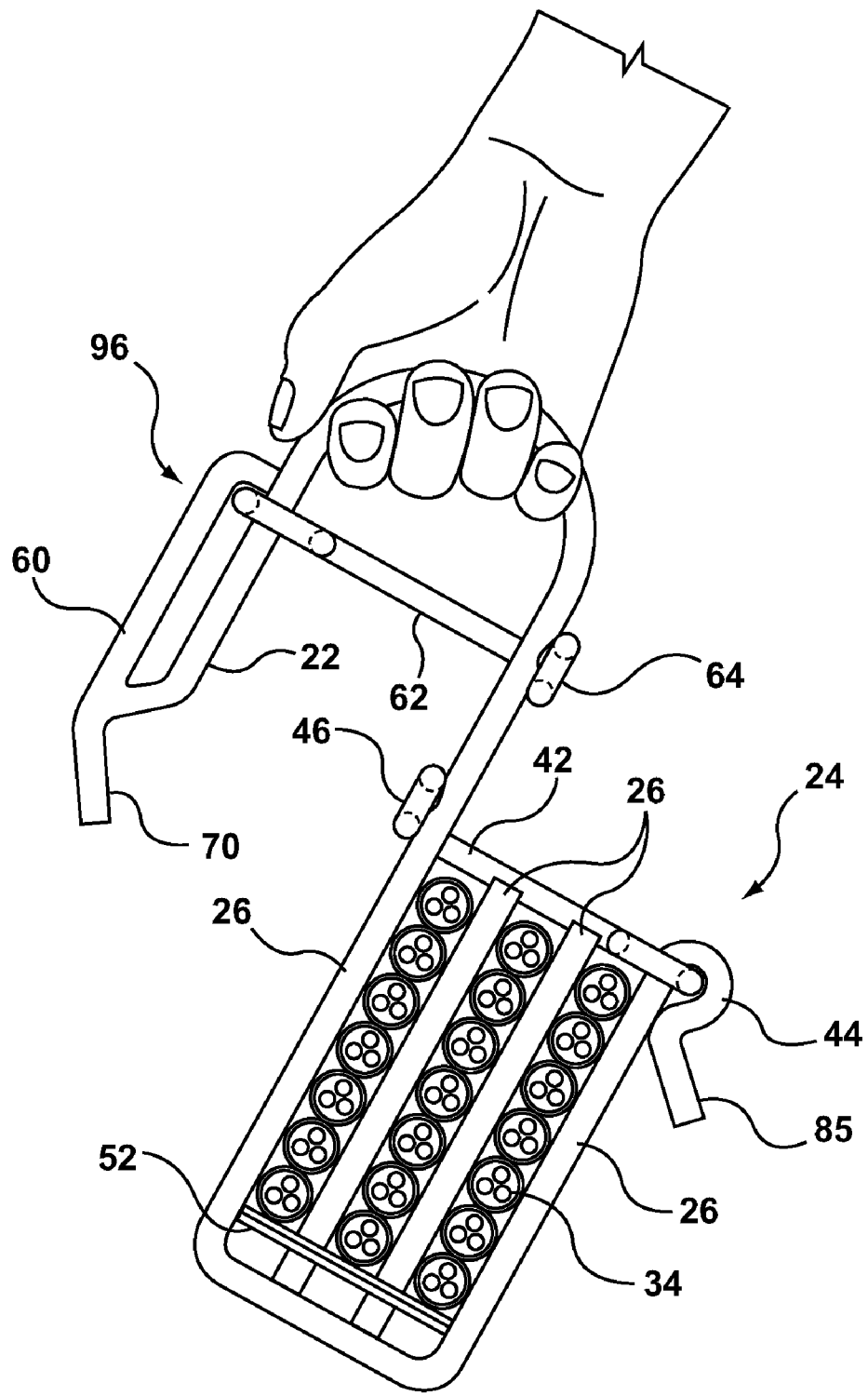
FIG. 14 is a perspective view of the third embodiment of a cable hanger made in accordance with the invention and shown being carried by a hand.

Finally, FIG. 14 shows an embodiment 96 of a cable hanger made in accordance with the invention which incorporates four parallel legs 26, defining three receiving slots to increase the capacity of the cable hanger without having to increase the length of the receiving slots 28. In the embodiment illustrated, the second tie bar 62 is shown in the upward orientation at a top end of the guide 60 where it operates to hold the hooked mounting end 22 in a spaced parallel disposition relative to an outer leg 26 of the cable support portion 24. Conveniently, the second tie bar 62 will act as a guard to protect fingers from being pinched when manually carrying the cable hanger 96 on a job site from one location to another. Once at the required location, the first tie bar 42 is released and the cable 34 is unwound one loop at a time in an orderly fashion by simply pulling the cable from the free end which was last placed in the cable hanger for storage. When the job is complete, the process is simply reversed, the cable and cable hanger are secured, as necessary, and the equipment is safely stored until needed again.

Figure 18:
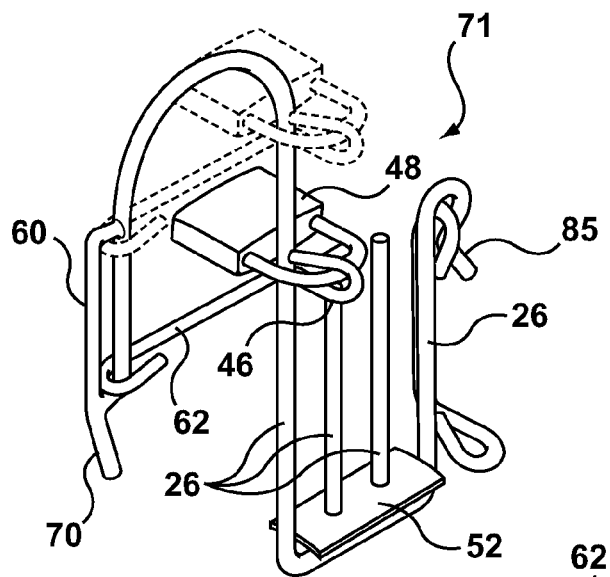
FIGS. 18 to 20 show the third embodiment of a cable hanger with tie bars in various positions for use to secure the cable hanger and cable.
Figure 19:
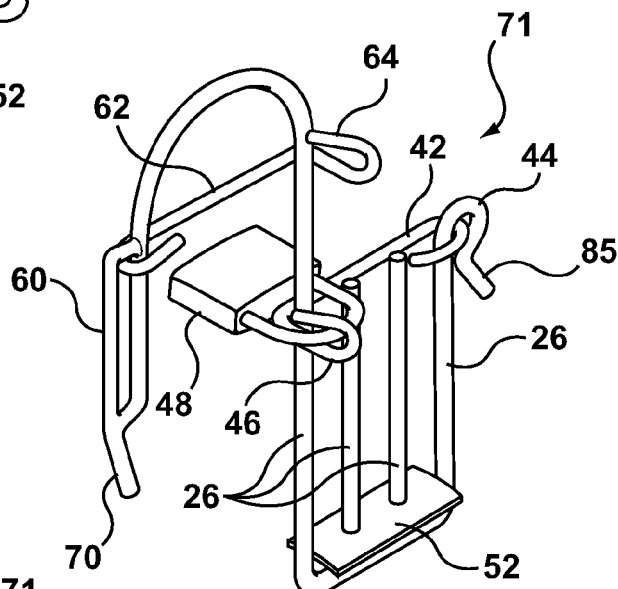
Figure 20:
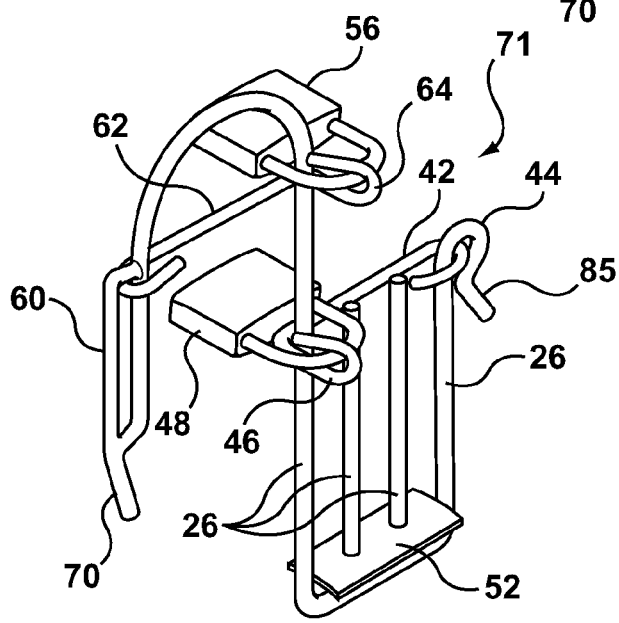

FIG. 18 shows the cable hanger with bar 62 locked to leg 26, also shown is a phantom view of the bar 62 in the upward orientation of guide 60. FIG. 19 shows the bar 42 locked, preventing the removal of cable. In FIG. 20 tie bars 62 and 42 are both locked separately. The bar 62 prevents removal of the cable hanger while the bar 42 prevents removal of cable.

Figure 21:
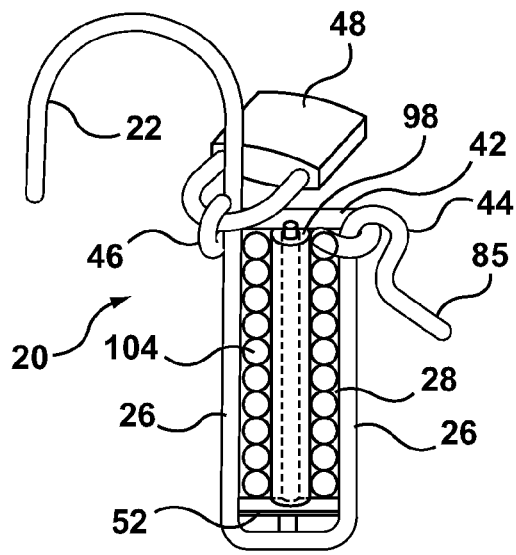
FIG. 21 shows the second embodiment of a cable hanger with an adapter inserted to accommodate small diameter cable.

FIG. 21 shows a cable hanger with the width of slot 28 set for a ½ in cable. If one wishes to store a thinner diameter cable 104 in this unit, a rubber hose adapter 98 such as a gas line hose can be slid over central leg 26 as shown. Once this adapter has been installed, a thin cable or rope such as an anchor rope for a small boat can be placed in receiving slots 28 allowing for vertical stacking. Without this hose, a ¼ in rope could jam or bunch up in receiving slots 28, preventing smooth deployment of the rope.

Figure 22:
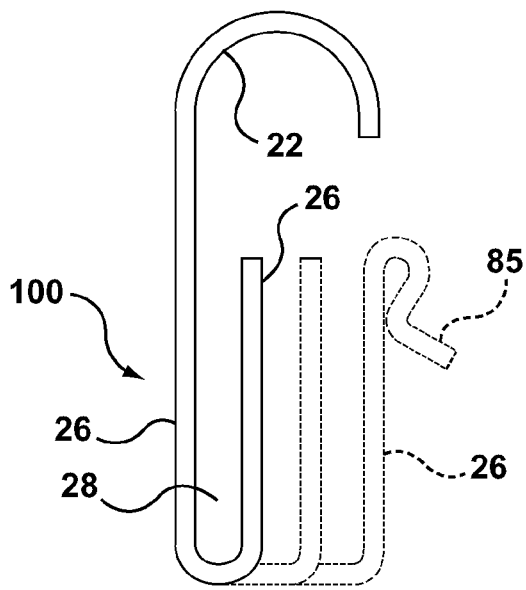
FIG. 22 is a side elevation view of embodiment nine of a cable hanger made in accordance with the invention.
Figure 23:
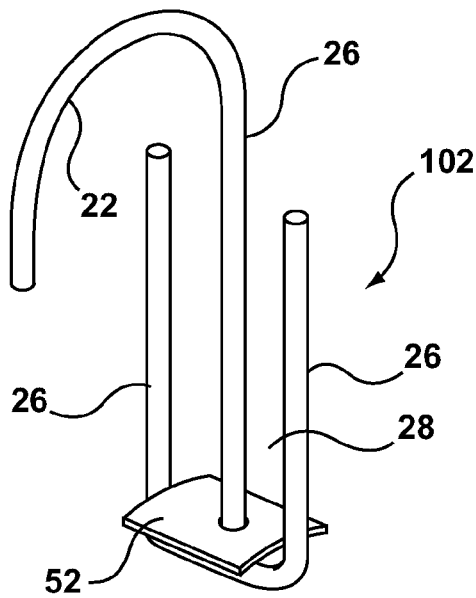
FIG. 23 is a side elevation view of embodiment ten of a cable hanger made in accordance with the invention.

As exemplified by the various embodiments illustrated, the invention may be varied by those skilled in the art without departing from the scope of the appended claims. While the embodiments illustrated show the mounting end and the outer legs of the cable support portion being formed from one length of the bent rod having a general S-shaped configuration, it will be understood that variations such as shown in FIGS. 22 and 23 are also possible. In FIG. 22, the cable hanger 100 has a mounting end 22 which is an extension of an outer leg 26 and is bent to curve over the cable support portion 24. The mounting end 22 could also be omitted and simply replaced by the mounting hook 85 for attaching the cable hanger to a support structure in the manner illustrated by FIGS. 10 to 12. In FIG. 23, the cable hanger 102 has a mounting end 22 which is an extension of an inner leg 26. Other variations will also be apparent including, for example, selecting different materials for construction of the cable hanger which could optionally be made from a plate material instead of wire rod.

The invention claimed is:

1. A cable hanger having a mounting end for attachment to a support structure and a cable support portion coupled to the mounting end, the cable support portion having at least three spaced parallel legs defining side-by-side receiving slots therebetween, each receiving slot having a closed bottom end and an open top end and adapted to receive and locate loops of a cable formed into a coil, the cable hanger having a releasable tie-bar disposed to lie across the open top end of the receiving slots to trap cable between the tie bar and the closed bottom end of said receiving slots, wherein a plate extending between legs of the receiving slots is fixed to the cable support portion and spaced from the closed bottom end of said receiving slots to define at least one closed loop for receiving a padlock hasp.

* * * * *